United States Patent
Deguy et al.

(10) Patent No.: US 9,959,663 B2
(45) Date of Patent: May 1, 2018

(54) SYSTEM AND METHOD FOR GENERATING PROCEDURAL TEXTURES ON AN OBJECT

(71) Applicant: ALLEGORITHMIC, Clermont-Ferrand (FR)

(72) Inventors: Sebastien Deguy, Clermont-Ferrand (FR); Christophe Soum, Clermont-Ferrand (FR); Cyrille Damez, Clermont-Ferrand (FR); Eric Batut, Clermont-Ferrand (FR)

(73) Assignee: ALLEGORITHMIC, Clermont-Ferrand (FR)

( * ) Notice: Subject to any disclaimer, the term of this patent is extended or adjusted under 35 U.S.C. 154(b) by 0 days. days.

(21) Appl. No.: 14/905,529

(22) PCT Filed: Jul. 15, 2014

(86) PCT No.: PCT/IB2014/001326
§ 371 (c)(1),
(2) Date: Apr. 25, 2016

(87) PCT Pub. No.: WO2015/008134
PCT Pub. Date: Jan. 22, 2015

(65) Prior Publication Data
US 2016/0247311 A1    Aug. 25, 2016

(30) Foreign Application Priority Data

Jul. 18, 2013    (FR) ..................................... 13 01710

(51) Int. Cl.
*G06T 15/00*    (2011.01)
*G06T 15/04*    (2011.01)
(Continued)

(52) U.S. Cl.
CPC .............. *G06T 15/04* (2013.01); *G06T 15/10* (2013.01); *G06T 19/20* (2013.01); *G06T 2219/2012* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS 5,432,896 A * 7/1995 Hwong ................. G06T 11/001 345/592
6,198,489 B1 * 3/2001 Salesin ................. G06T 11/001 715/784

OTHER PUBLICATIONS

Dorsey, J., Pederseny, H., and Hanrahanz, P. Flow and Changes in Appearance, Aug. 1996 ACM-0-89791-746-4/96/008.*
(Continued)

*Primary Examiner* — Ke Xiao
*Assistant Examiner* — Gordon Liu
(74) *Attorney, Agent, or Firm* — Karceski IP Law, PLLC

(57) ABSTRACT

A system and method for generating textures on an object from physical ink data and physical applicator data, including: receiving, by a module for generating a rendering outside the object (RHO), the physical ink and physical applicator data and transforming this data to provide a rendering outside the object comprising compatible physical data for projection against a target object regardless of the projection mode; receiving, by a module for transforming RHO, the previously obtained RHO data, and adapting this data for a given rendering projection mode; and receiving, by a module for integrating the physical parameters, the data of the object, the data of the set of textures, the transformed RHO data, and generating a new set of textures for said objects.

12 Claims, 2 Drawing Sheets

(51) Int. Cl.
*G06T 15/10* (2011.01)
*G06T 19/20* (2011.01)

(58) Field of Classification Search
USPC .......................................................... 345/419
See application file for complete search history.

(56) References Cited

OTHER PUBLICATIONS

International Search Report dated Jul. 20, 2015, for International Patent Application No. PCT/IB2014/001326.
Dorsey et al. "Flow and Changes in Appearance", Computer Graphics Proceedings 1996, New Orleans, Aug. 4, 1996, pp. 411-420.
Jianye et al., "Context-aware textures", ACM Transactions on Graphics, vol. 26, No. 1, Jan. 1, 2007, pp. 3-31.
Hanrahan et al., "Direct WYSIWYG painting and texturing on 3D shapes", Computer Graphics, vol. 4, No. 24, Aug. 4, 1996, pp. 215-223.

* cited by examiner

SYSTEM AND METHOD FOR GENERATING PROCEDURAL TEXTURES ON AN OBJECT

CROSS-REFERENCE TO RELATED APPLICATION(S)

This is a National Stage Entry into the United States Patent and Trademark Office from International PCT Patent Application No. PCT/IB2014/001326, having an international filing date of Jul. 15, 2014, and which claims priority to French Patent Application No. 13/01710, filed Jul. 18, 2013, the entire contents of both of which are incorporated herein by reference.

FIELD OF THE INVENTION

The present invention relates to a system and a method for generating textures on an object using data other than the colorimetric data.

DESCRIPTION OF THE RELATED ART

In the field of computer graphics a myriad of tools have been used for many years to apply colors to objects. Conventionally, a color is applied as a layer, in the manner of a layer of paint applied to an actual physical substrate.

The application of a layer of color typically produces a uniform result. To obtain variations in color, intensity or opacity, a user must manually adjust the color settings at each point, thereby creating an accurate and detailed color mapping. Various graphical tools such as virtual brushes and applicators are made available to the user who performs such a "mapping".

To change a previously established "mapping", the user employs the same types of tools in order to apply the changed parameters point by point, and thus to generate a modified colorimetric result. Even though the user can use a frame to select multiple points to be changed in a similar fashion, the process must be carried out manually for each image, and therefore requires a considerable amount of time.

Different filters are also known, which may be applied to one or more colors of an image. Conventionally, such filters act to change the colors based on parameters that are intrinsic to the colors themselves. These filters therefore allow effects to be created based on either the chosen environment or style imposed by a user or according to the original parameters of the colors to be processed.

Thus, the process of creating or modifying object colors does not allow the parameters or characteristics of the objects on which the color is applied, nor the environment in which the objects are arranged in the scene, to be taken into account. Thus, to create realistic effects, a user must proceed manually in order to determine the target points or areas, the parameters to be modified, and the level of modification of the selected parameters. If one or more objects from a scene or scenes are to be processed, considerable time may be needed to carry out the required operations.

For example, for the coloring of an area of wooden material in order to impart it with a realistic wooden appearance, a user must perform the parametric adjustments in a meticulous and accurate manner. As the coloring tools do not take material properties or interactions between objects and their environment into account, a user wishing to create a visual effect based on a material's reaction or behavior must firstly envision or imagine the desired effect in a realistic manner, and then apply the color changes in accordance with the settings of the existing colors. Thus, if a color is applied to an object, its coloring impact will be the same on all areas of the object. For example, if the object has a metallic portion, a different wooden portion, and a plastic area, the applied color has the same effect on all of these areas, whereas on a real object, the effects produced on each of the materials will vary, or even be very different, depending on the circumstances.

FR2681967 discloses a method for modifying the colors of an image displayed on a display device based on the determination of colorimetric values. The method includes selecting at least one color indicative of at least one pixel in the image comprised of a plurality of pixels, determining the colorimetric values of said at least one color, selecting a second color and determining the colorimetric values of the second color, and modifying the colorimetric values of a plurality of pixels in the image so that for any given pixel of said plurality having colorimetric values which correspond to the colorimetric values of said at least one color, the colorimetric values of the given pixel are modified so that they correspond to the colorimetric values of the second color. The applied color is identical, whatever the nature of the object (plastic, wood, etc.) and does not take textures into account, but only color variations in an area selected by the user.

EP0884694 discloses a method for adjusting colors in digital images, including correcting "red eyes" in photographs. The pixel color data are adjusted by identifying the pixels in a digital image comprising original color data corresponding to the predetermined color. However, the color is applied automatically, based on colorimetric data only, in particular the colors of the iris.

WO2008066880 discloses a method for obtaining an original set of two or more original colors associated with an item of artwork. For that purpose, an input set of one or more user-selected colors is received. For each original color, the original color is mapped onto the derived colors. The plurality of derived colors is obtained based on one or more user-selected colors.

WO2012154258 discloses a three-dimensional colorimetric coloring tool. Each pixel in the image comprises a set of pixel values in a three-dimensional color space. Even though the applied color allows a wide range of colors to be used, it does not vary depending on the material on which it is applied.

Document "flow and changes in appearance", Dorsey J et Al, computer graphics proceedings 1996 (siggraph), Aug. 4-9, 1996; New York, N.Y.: ACM, pages 411-420, discloses a phenomenological model that is based on particle systems and equations for the modeling of surface water absorption and the sedimentation of deposits. The document describes a model with examples of flows of water over complex geometries. This document focuses in particular on the explanation and configuration of phenomena related to water absorption on surfaces and the sedimentation of deposits.

There is therefore a need to overcome these various disadvantages.

An object of the invention is to provide a system and method for improving the efficiency and productivity of graphic design tools.

Another object is to provide a system and graphical method for increasing the flexibility and graphics capabilities when generating colors or renditions.

Another object of the invention is to provide a system and graphical method for increasing the realism of the represented items.

Yet another object of the invention is to provide a system and method for improving the interactivity between the rendition of a represented object and its environment.

Yet another object of the invention is to provide a system and method for creating a contextual editing mode which takes environmental parameters into account.

SUMMARY

To achieve this object, the invention provides various technical means. For example, the invention first provides a system for generating procedural textures on an object using physical ink data and physical applicator data, comprising:

- access to physical ink data comprising a plurality of parameters among the following: color, viscosity, temperature, drying rate, chemical composition, transparency level;
- access to physical applicator data comprising a plurality of parameters among the following: width, depth, thickness, profile, roughness, porosity, flexibility of the applicator;
- access to target object data;
- access to mixing rule and function data;
- access to original physical texture T data;
- a microprocessor and control instructions;
- a before-projection virtual rendition generator module, for combining physical ink data with physical applicator data;
- a before-projection virtual rendition transformation module, for adapting the rendering of this data to a given rendering projection mode;
- a physical parameter integrator module, provided for generating a new set of textures T+1 for said one or more objects, which takes into account the object data, the texture set T data, and the transformed before-projection virtual rendition data.

Such a system makes it possible to apply, onto one or more objects in a scene, not only color characteristics, but also physical and/or chemical characteristics inherent to the object itself, to its environment, or to a physical or chemical phenomenon or process brought into interaction with the object. This approach provides a new way to create and/or develop object textures in such a way as to mimic with stunning realism phenomena that may occur in the real world.

Advantageously, the system comprises an integrator module, intended for the use of combination rules and/or functions to define and/or adjust the modes in which the different physical parameters are integrated together.

Advantageously, the system comprises access to available application rate and/or environmental data, when available.

In one advantageous alternative embodiment the integrator module comprises a rule selection sub-module and a rule implementation sub-module for, on the one hand, selecting at least one applicable rule and/or function and, on the other hand, determining the mode of application of the rule in order to generate the resulting texture T+1 data.

The system is thus highly flexible, for example, allowing rules to be provided, according to which a given parameter, such as corrosion, will have an effect on a metallic material, and have no effect on a PVC material.

According to another advantageous embodiment, the system comprises a temporal storage module, for keeping the data required to generate a new set of textures of an object for which one or more parameters are modified, or to return to an earlier step of a process, in the same state as that of the parametric architecture in that earlier step.

Such a temporal mode enables the fast and easy performance of tests or parametric comparisons between different architectures, without having to change all the parameters of a process, or revert to an earlier stage, thus without having to parameterize all of the data again.

According to yet another alternative embodiment, the system further comprises an application-path user-data receiving module. Such a module is adapted to receive data relating to points or areas where the physical parameters are applied.

Thus, in the case where user data is received from the very beginning or at the start of the process and/or thereafter, the method and/or system is then advantageously similar to a graphic design tool for artists. In the absence of such user data, the method and/or system may be similar to a stand-alone process, for example, during the course of a scene, in order to make the objects move by means of an evolutionary algorithm. According to yet another advantageous embodiment, the system further comprises a data item relevant to the application rate of the off-object rendition onto the object.

The invention also provides a method for generating procedural textures on an object using physical ink data and physical applicator data, which comprises the following steps:

- a before-projection virtual rendition generator module combines the physical ink data with the physical applicator data;
- a before-projection virtual rendition transformation module receives the previously obtained virtual rendition data before projection, and adapts this data to a given rendering projection mode (vector/unidirectional or normal/tangential);
- a physical parameter integrator module receives the object data, the texture set T data, the before-projection transformed virtual rendition data, and any corresponding application rate and environmental data, and generates a new set of textures T+1 for said one or more objects, taking this data into account.

In an advantageous embodiment, the integrator module receives integration rules and/or functions to define and/or adjust the modes in which the different physical parameters act together.

According to yet another embodiment, a rule selection sub-module selects at least one applicable rule and/or function and a rule implementation sub-module determines the mode of application of the rule in order to generate the resulting texture T+1 data. According to yet another advantageous embodiment, a temporal storage module keeps the data required to generate a new set of textures (T+1) of an object for which one or more parameters are modified or to return to an earlier step of a process, in the state in which the parametric architecture was in that earlier step. In another alternative embodiment, an application-path user-data input module receives the data relating to the application path of the physical parameters.

DESCRIPTION OF THE DRAWINGS

Other features and advantages of the present invention will become more apparent upon consideration of the following description, given by way of non limiting example, in conjunction with the accompanying drawings, in which.

In the following description, substantially identical or similar items will be designated by the same reference numerals.

DETAILED DESCRIPTION OF EMBODIMENT(S) OF THE INVENTION

Figure 1:
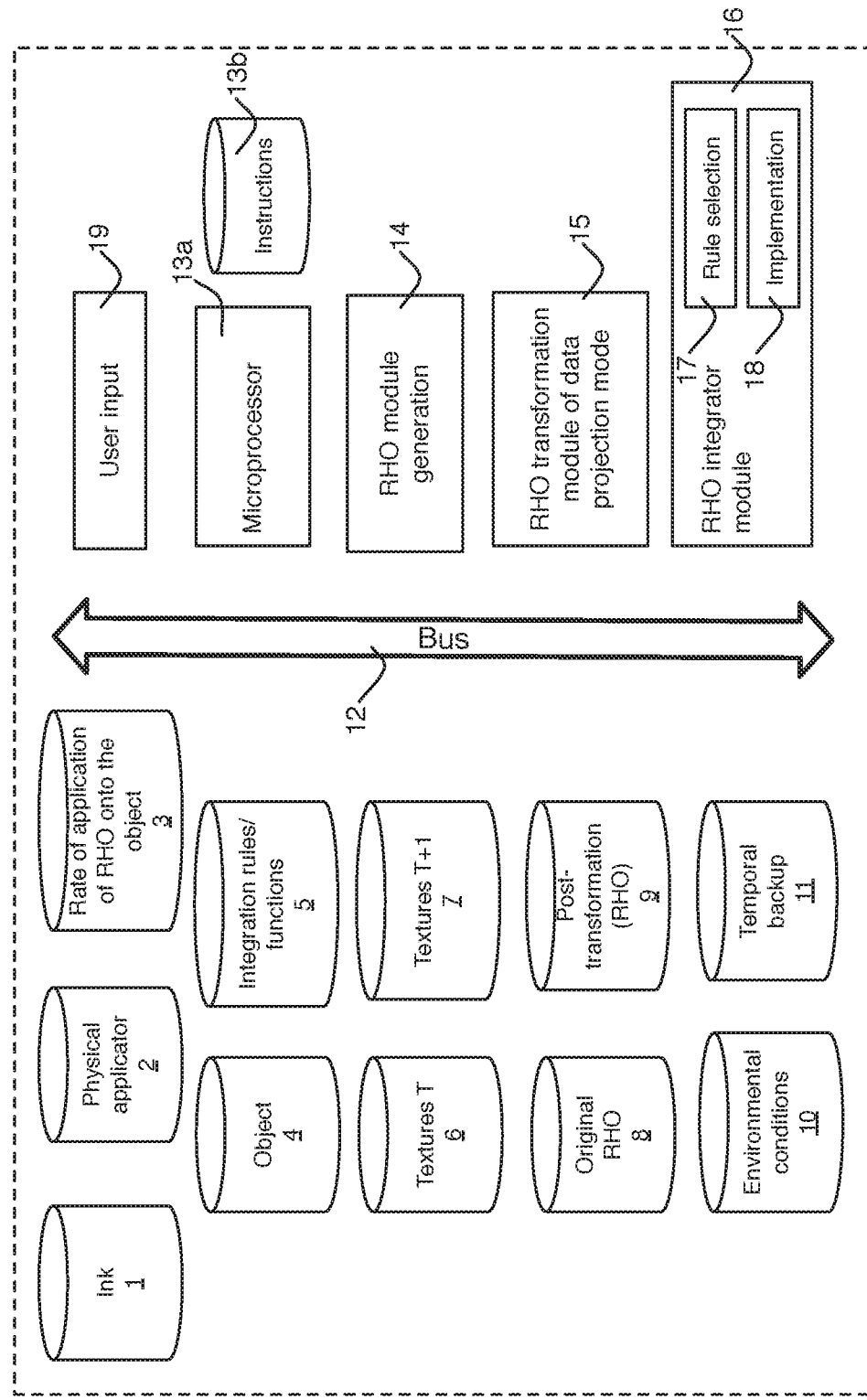
FIG. 1 schematically shows an example of a texture generator system according to the invention.

By physical "ink" or "paint" is meant a solid, liquid, gaseous item or a mixture of these phases, which, when applied to an object, generates a physical change at least on the surface of this object, in particular to textures of the object, so that at least one of its physical parameters or characteristics, in particular a visible characteristic, is changed.

By "physical parameter" is meant any physical and/or chemical item, property or characteristic, capable of being detected or measured or observed or quantified, which characterizes an object, an ink, an environment, an applicator, etc.

By "parametric architecture" is meant the set of parameters that define the physical, chemical (components, properties, visual appearance of an object, texture, ink, etc.) and behavioral characteristics of an item (ink, texture, object, etc.).

By "physical applicator" is meant an item, in particular a virtual item, whether visible or not in a scene, for applying an ink or paint onto a physical object, such as a brush, roller, pencil, applicator gun, nozzle or spray, plate, tool, etc.

By "application rate" is meant the overall opacity of the brush/applicator stroke a user applies, which is adjustable by the user and uncorrelated to other parameters such as the ink. For example, when a user begins the painting process on an object that is not, or is slightly covered, the "application rate" can be set to a large value, so that each brush/applicator stroke strongly influences the texture of object. When the user reaches a phase of refinement and small enhancements, he can adjust said rate to a lower value in order to avoid entirely changing locations already painted, but instead to carefully adjust certain details.

Depending on the circumstances and embodiments, the application rate can be expressed in several ways. For example, the application rate $\tau$ can be expressed by a value between 0 and 1. If there are two inputs A (the existing texture) and B (the texture to be applied), the output Y is equal to "$A*(1-T)+B*T$". If $\tau=0$, nothing is applied, and the new texture is equal to the existing one. If $\tau=1$, then the new texture is equal to the texture to be applied (at points affected by the brush stroke) and the old texture is entirely covered in the relevant areas.

By mixing "rule" or "function" is meant a description of the process which determines the way a material (and optionally one or more "inks" already applied to the material at a given location) and an ink applied to this material will react. A few sample rules are given below by way of illustration:
- a liquid applied to bare wood is absorbed by the wood. Alternatively, this causes the wood's hue to darken;
- a liquid applied to a varnish or plastic is not absorbed at all and produces "beads" of liquid on the surface of the material;
- heat applied to a painted material causes the paint to peel and then burn depending on the temperature set by the user, and optionally cause combustion of the material on which the paint is applied if the latter is combustible;
- application of an acid to, or sandblasting of a glossy plastic material will gradually roughen it, thus making it less glossy and increasingly rough. Through the method and system described in the following, the various stages of an evolutionary process can be determined and presented.

By "procedural texture" is meant a texture defined using algorithms and/or mathematically, and displayed by a rendering engine which transforms the mathematical data into a conventional image format such as bitmap, for example.

FIG. 1 illustrates an exemplary system for generating procedural textures according to the invention. The system comprises at least one microprocessor 13a, suitable for the implementation of instructions in an instruction memory 13b. A plurality of modules are advantageously provided through the implementation of these instructions by the microprocessor.

An ink data item 1 stores physical parameter data relevant to the one or more available inks. For example, this data comprises the color, viscosity, temperature, drying rate, chemical composition, transparency rate, etc.

A physical applicator data item 2 stores the data relevant to the physical applicator characteristics. This data may include a plurality of parameters such as width, depth or thickness, profile, roughness, porosity, flexibility of the applicator, etc. These may generally be any parameter that may influence the application characteristics of an ink onto a destination object. Indices can be assigned to each of the parameters in order to weight their relative significance levels.

An application rate data item 3 stores the physical parameter data related to the application rate for off-object rendition.

A target object data item 4 stores the data relevant to target objects that may be modified by the applied physical parameters. For example, this data comprises the physical characteristics of the target objects such as shapes, dimensions, weight, absorption coefficient, porosity, chemical composition and various characteristics related to the surface and textures of the objects.

A data item 6 for object textures T stores the data relevant to the original texture of the target objects onto which one or more inks may be applied. Any newly obtained texture T+1 data is contained in a memory element 7. Such data include, for example, physical characteristics such as ink composition, color, thickness, brightness, relief, light reflection characteristics, etc.

An integration data item stores the data relevant to the rules and/or functions to be applied by integrator 16 to generate the new set of textures T+1. These rules and/or functions allow one or more processes that can influence the result to be taken into account, such as color mixing (for example, a rule can be used to calculate the average values of the applied colors), chemical interactions between components, diffusion by capillary action, combustion or any thermodynamic process, a drop effect, a modification or alteration of the surface of the object (e.g. corrosion or oxidation, mold, flaking, etc.)

An off-object rendition (RHO) data item 8 stores the rendition data obtained after the ink data and physical applicator data have been combined. Any post-transformation of off-object rendition data (RHO) obtained after taking into account the expected projection mode is contained in a memory element 9. This data includes, for example, physical characteristics such as ink composition, color, thickness, brightness, relief, light reflection characteristics, etc.

An optional item for parameters related to environmental conditions 10 includes parameters that may affect several items in a scene, such as data related to temperature, pressure, humidity, physical force (magnetic, gravitational or the like), etc.

An optional temporal backup module 11 keeps the data related to a time scale, in particular user inputs such as path, pressure, direction, or opacity data, etc. For example, this module allows an animated simulation to be rerun after changing one or more parameters, by only performing the operations required by the changed data. It is thus possible to simply and quickly carry out several consecutive simulations based on a previous simulation, or to find a previously performed simulation.

The above-described memory elements and/or the various modules can be combined into one or more components and one or more modules without significantly affecting the system's operation.

A user input section 19 can receive data from an external source, such as, in particular, from a user who provides a path of application of the physical parameters. This input section can be used to receive several types of parameters such as pressure, direction, or opacity data, etc., in order to correctly define, quantify and delineate the parametric components applied.

A module 14 for generating off-object rendition (RHO) is provided for generating an off-object rendition which comprises RHO physical data adapted for projection onto a target object independently of the projection mode. The RHO is obtained based on the physical ink and physical applicator data.

An RHO transformation module 15 is provided to adapt RHO data to a given rendition projection mode (vector/unidirectional or normal/tangential).

A physical parameter integrator module 16 is provided for generating a new set of textures T+1 for said object, by taking into account object data, the texture set T data, transformed RHO data, and any corresponding application rate and environment data.

Integrator module 16 comprises a rule selection sub-module 17 and a rule implementation sub-module 18 for, on the one hand, selecting at least one applicable rule and/or function and on the other hand, determining the rule application mode in order to generate the resulting texture T+1 data.

A bus 12 enables data transfers among the various and memory elements described below.

Figure 2:
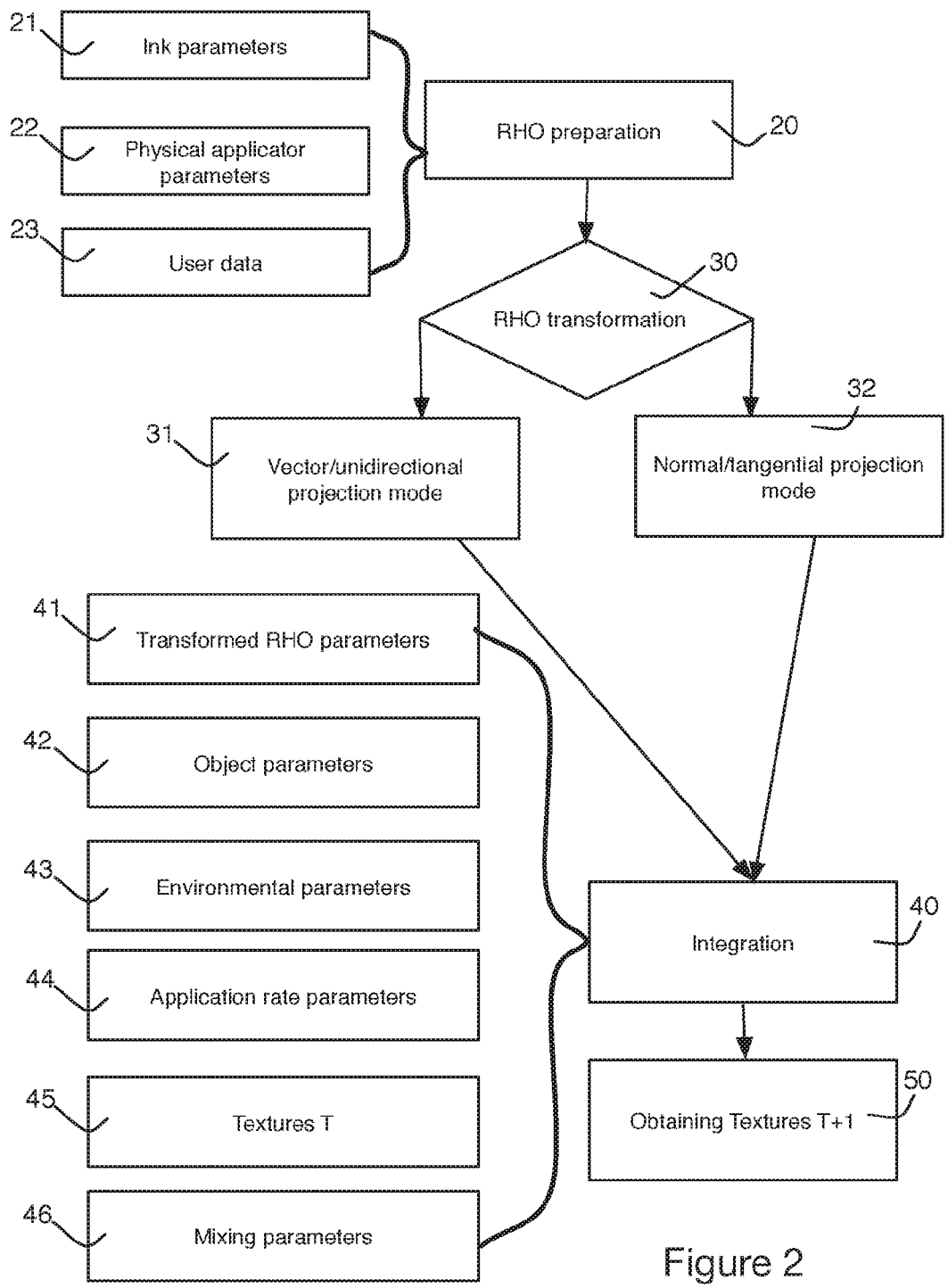
FIG. 2 is a block diagram showing the main steps of the texture generating method according to the invention.

FIG. 2 shows a flowchart of the main steps of the method for generating procedural textures according to the invention. In step 20, the system is initialized and the off-object rendition (RHO) generator module 14 receives data 21 and 22 related to ink parameters and physical applicator parameters, and user data 23 related to physical parameter application path. The off-object rendition is generated by the off-object rendition generator module 14.

In step 30, the off-object rendition transformation module 15 performs a transformation of the rendition into the format required by the applicable projection mode. According to this mode, in the case of a vector or unidirectional projection mode, step 31 is involved. In the case of a normal or tangential projection mode, step 32 is performed.

Regardless of the type of projection, the next step 40 causes the integrator module to perform off-object rendering. This step involves selecting applicable rules and or functions and implementing the integration based on the applicable rules and/or functions. In this step, the physical parameters are integrated, such as the object parameters, application rate, texture T and environmental parameters in order to generate and/or adapt a new set of textures T+1 for the object or objects affected by the events occurring in the scene. Finally, in step 50, the texture T+1 data is obtained.

Alternatives and Other Embodiments

In the above, the system and method of the invention have been disclosed in a working environment suitable for an editing tool, for a user who intends to create or modify the rendition of one or more objects.

Alternatively, the system and method according to the invention are used in a standalone mode, for generating renditions of objects using physical parameters that are predetermined or may be calculated by the system itself, for example based on intermediate results. Such exemplary embodiments are advantageously used for video games or movies, in particular games or movies in which textures are rendered or generated by a procedural texture generation engine. Document WO2012014057, which is incorporated by reference herein, describes an example of such a rendering system and process.

The system and method according to the invention allow renditions of objects to be generated and/or modified, taking into account the technical (physical, chemical, thermodynamic, etc.) factors inherent to the objects themselves as well as the scene's environment.

For example, to create a corrosion effect on an object, a user may use a paint or ink and objects having corrosion-related parameters. Among these physical parameters (other than color data) the behavior of objects with respect to the applied inks or paints, that is to say, the interactions between the different physical items can for example be such that materials such as plastic do not react to corrosion effects, steel develops corroded areas, copper oxidizes, etc.

According to the embodiments, certain parameters can be assigned either to physical inks or paints, or to objects, or to the environment, or else, to the mixing rules or functions. The parametric distribution or architecture can also vary in order to produce comparable renditions.

In another exemplary use of the method and system according to the invention, the paint or ink to be applied to physical objects comprises only non colorimetric parameters, such as thermal energy or heat data, pressure data, etc. In one example, in which the physical applicator applies heat, the latter can be a soldering iron which performs pyrography operations on a wood plate. If a metal edge delineates the wood area to be etched, parameters and rules allow the physical phenomena to be managed such that the application of the soldering iron to the metal produces no "burnt" effect. The application path data define the design or pattern produced by the etching operation. Depending on the case, the path data may be provided by a user who simulates the movement of the iron, or an application card provided as input.

In another example, a paint solvent is applied to a table top by means of nozzles. The original textures of painted wood are substituted with textures comprised of the same wood, but in its natural state, without paint. Depending on the application path, one or more areas in which paint residues remain may still be present on the object.

Table 1 below illustrates examples of parameters and rules allowing the discussed examples to be implemented.

TABLE 1

Example of physical parameters

| Ink/paint | Applicator | Object | Mixing rule/function | Original texture | Final texture |
|---|---|---|---|---|---|
| Corrosive liquid | Brush or roller | Metal body | Corrosion mode and strength on metal | New metal | Rusted metal |
| Heat | Soldering iron | Wood plate | Heat effect and intensity | Light-colored wood | Burnt wood |
| Solvent liquid | Spray (nozzle) | Table top | Chemical etching effect and strength | Painted wood | Natural wood |

Temporal backup advantageously makes it possible to go back into a process in order to recover one of the multiple previous states. This also allows a process to be rerun by modifying only one or a few parameters, while advantageously keeping the other parameters unchanged, thus avoiding having to parameterize all of the data again. It is thus possible, for example, to easily and quickly compare results obtained by only modifying some of the parameters.

For example, it is possible to change an ink characteristic (e.g. color) for one or more previously applied strokes during the process. In another example, the inks viscosity is changed to reduce the effect of the ink on a previous layer.

The above-described figures are given by way of non-limiting example of the present invention.

The reference numerals in the claims have no limiting character. The words "comprise" and "include" do not exclude the presence of items other than those listed in the claims. The word "a" preceding an item does not exclude the presence of a plurality of such items. In addition, the above-described system and method advantageously operate in a multi-channel configuration, that is to say, by processing several textures (diffuse, normal, etc.) at each step. Thus, the terms "texture T (or T+1)" and "textures T (or T+1)" relate to one or more textures as appropriate, or depending on the embodiments.

The invention claimed is:

1. A system for generating procedural textures on an object using physical ink data and physical applicator data, comprising:
    access to physical ink data comprising a plurality of parameters comprising color, viscosity, temperature, drying rate, chemical composition, and transparency level;
    access to physical applicator data comprising a plurality of parameters comprising width, depth, thickness, profile, roughness, porosity, and flexibility of the applicator;
    access to target object data comprising target object procedural data modifiable by the physical parameters that are applied;
    access to mixing rule and function data;
    access to original physical procedure texture set T data;
    a microprocessor and control instructions;
    a before-projection on the target object off object virtual rendition generator module, for combining procedural physical ink data with procedural physical applicator data to create before-projection virtual rendition data;
    off-object virtual rendition data comprising rendition data obtained after combination of the ink data and the physical applicator data before projection on the target object;
    a before-projection on the target object virtual rendition transformation module, for adapting the rendering of the before-projection off-object virtual rendition data to a given rendering projection mode on the target object;
    a physical parameter integrator module, provided for generating procedural texture set T+1 data for said one or more target objects, which takes into account the target object data, the texture set T data, and the before-projection virtual rendition data transformed as a function of the projection type.

2. The system for generating procedural textures according to claim 1, comprising an integrator module, used for at least one of combination rules and functions to at least one of define and adjust modes in which different ones of the parameters are integrated together.

3. The system for generating procedural textures according to claim 2, wherein the integrator module comprises a rule selection sub-module and a rule implementation sub-module for at least one of selecting at least one of an applicable rule and function and determining the mode of application of the rule to generate the texture set T+1 data.

4. The system for generating textures according to claim 1, further comprising a temporal storage module, for keeping data required to generate the texture set T+1 data for which one or more of the parameters are modified, or to return to an earlier texture set data.

5. The system for generating textures according to claim 1, further comprising an application-path user-data receiving module.

6. The system for generating textures according to claim 1, further comprising access to data relevant to the application rate of the off-object rendition onto the object.

7. A method for generating procedural textures on an object using physical ink data and physical applicator data, comprising:
    combining, by a before-projection on the target object off-object virtual rendition generator module, the procedural physical ink data with the procedural physical applicator data before proceeding to application on the target object;
    receiving, by a before-projection off-object virtual rendition transformation module, previously obtained virtual rendition data before projection, and adapting the previously obtained virtual rendition data to a predetermined rendering projection mode; and
    receiving, by a physical parameter integrator module, target object data, procedural texture set T data, and before-projection virtual rendition data transformed as a function of the projection type, and generating a procedural texture set T+1 data for said one or more objects.

8. The method for generating textures according to claim 7, wherein the physical parameter integrator module receives at least one of integration rules and functions to at least one of define and adjust modes in which different ones of physical parameters act together.

9. The method for generating textures according to claim 8, wherein a rule selection sub-module selects at least one of an applicable rule and function and a rule implementation sub-module determines a mode of application of the rule in order to generate the texture set T+1 data.

10. The method for generating textures according to claim 8, wherein a temporal storage module stores data required to generate texture set T+1 data for an object for which one or more of the physical parameters are modified or to return to an earlier texture set data.

11. The method for generating textures according to claim 8, wherein an application-path user-data input module receives data relating to the application path of the physical parameters.

12. The method for generating textures according to claim 7, wherein the receiving, by a physical parameter integrator module, includes at least one of a corresponding application rate and environmental data.

* * * * *